United States Patent [19]

Butler et al.

[11] 4,230,325
[45] Oct. 28, 1980

[54] CONJUGATE TWO-PIECE PACKING RING WITH LIMITER

[76] Inventors: Payson M. Butler, 14360 Rios Canyon Rd., Space 57; Jack O. Butler, 1244 E. Main St., both of El Cajon, Calif. 92021

[21] Appl. No.: 949,624

[22] Filed: Oct. 10, 1978

[51] Int. Cl.³ .............................................. F16J 15/10
[52] U.S. Cl. ....................................... 277/117; 277/190
[58] Field of Search ................ 277/101, 102, 114–119, 277/190, 191

[56] References Cited

U.S. PATENT DOCUMENTS

| | | | |
|---|---|---|---|
| 849,837 | 4/1907 | Eggleston | 277/115 |
| 1,979,141 | 10/1934 | Clark | 277/115 |
| 3,036,601 | 5/1962 | Fabian et al. | 277/117 |
| 3,207,523 | 9/1965 | Johnson | 277/190 |
| 4,039,198 | 8/1977 | Stanton | 277/118 |

Primary Examiner—Robert I. Smith
Attorney, Agent, or Firm—Knox & Knox

[57] ABSTRACT

A particularly durable two-piece packing ring for sealing fixed and reciprocating cylindrical elements such as sight glasses of steam boilers, puff iron valves and the like where gland nut assemblies are required to seal such tubes and rods, this packing ring being entirely non-metallic and in two mating parts, that is, an outer ring and an inner ring with preferably differently tapered confronting faces to be forced together by a gland nut for a limited interface sealing contact.

2 Claims, 3 Drawing Figures

CONJUGATE TWO-PIECE PACKING RING WITH LIMITER

BACKGROUND OF THE INVENTION

The prior art is extensive. Many seals have been developed which, at least when newly installed, will provide excellent sealing. Prior forms include seals with tapered cross sectional shapes combined with tapered metal followers in gland nut assemblies, such as those disclosed in U.S. Pat. No. 2,021,745 issued to Pfefferle et al. In practice it has been found that the useful life of such seals is limited especially when high and variable temperatures are encountered. All-metal sealing assemblies employing tapered rings, followers and the like are well known, the U.S. Pat. No. 3,380,765 to Himmel showing several such concepts. Further, the concept of line contact between the tapered parts is also recognized as not being shown, for example, in U.S. Pat. No. 3,265,413 issued to Currie wherein the line contact is stated as being capable of being "widened with moderate clamping pressure" indicating that the resiliency of metal parts, although limited, is useful in sealing techniques. Other prior art of which applicants are aware includes the following fairly recently issued patents:

U.S. Pat. No. 3,171,935 to Gloeckler;
U.S. Patent No. 3,186,743 to Russell;
U.S. Pat. No. 3,694,010 to Callahan; and
U.S. Pat. No. 2,951,721 to Asp.

The last above mentioned patent includes a detailed discussion of the use of seals constructed of TEFLON in several forms.

There is a need, however for a seal which will last almost indefinitely when the the use thereof is not persistent and which will have a useful life of years even when the use is continuous or under conditions of varying temperatures.

SUMMARY OF THE INVENTION

As claimed, the item herein disclosed meets the need mentioned immediately above, comprising conjugate or co-axially iterfitted outer and inner rings, adapted to be pressed together by gland nuts or the like, each ring having a tapered face providing an inclined interface between the rings, the outer ring being stouter both as to wall thickness and hardness, and both rings being non-metallic. Limited annular interface sealing or "line sealing" is achieved by reason of the angles of taper being preferably considably different in the two rings, and a penetration-limiter on the male or inner ring is provided.

DETAILED DESCRIPTION OF A PREFERRED EMBODIMENT

Figure 1:
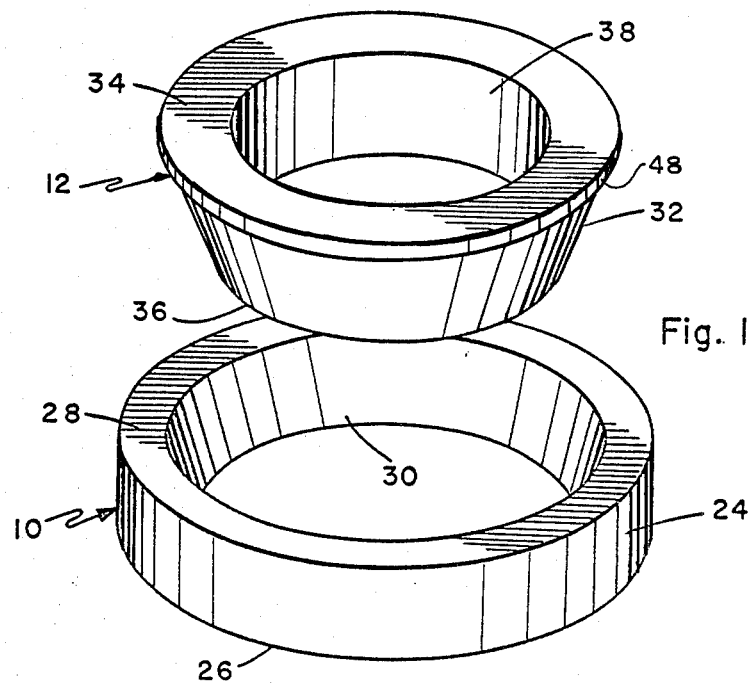
FIG. 1 is a perspective view of the two ring components.
Figure 2:
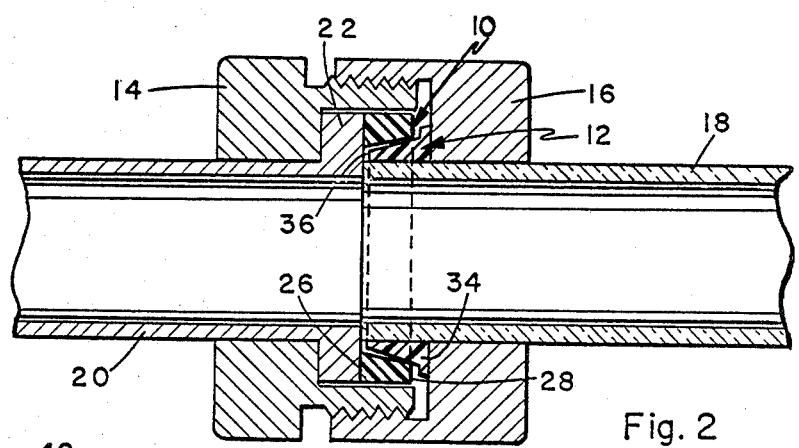
FIG. 2 is an axial sectional view of the packing ring as employed in sealing dissimilar elements exemplified by a glass-to-metal tube coupling.

Referring now to the drawing, the seal will be recognized as consisting in an outer ring 10 and an inner ring 12 which are illustrated together in FIG. 1. Some means is required to press the rings together and this structure may vary, being illustrated in the drawing as a pair of gland nuts 14 and 16 in FIG. 2 as used to effect a seal between a sight glass fragmentarily shown at 18 and a metal tube 20 provided with a terminal flange 22 against which the seal is pressed by the gland nut 16.

The outer and inner rings 10 and 12 are both formed from non-metal material of suitable character, preferably polytetrafluroethylene as merchandized under the trade mark TEFLON. The outer ring 10 is of considerably greater wall thickness and/or slightly harder and thus adapted to provide near zero deformation in use. The radially outer surface 24 of this outer ring is recticylindrical and the wall thickness is tapered from the larger flat end face 26 to a reduced end face 28 with the angle of the taper being preferably on the order of 20° to provide taper bore face 30 to receive the inner ring 12.

Figure 3:
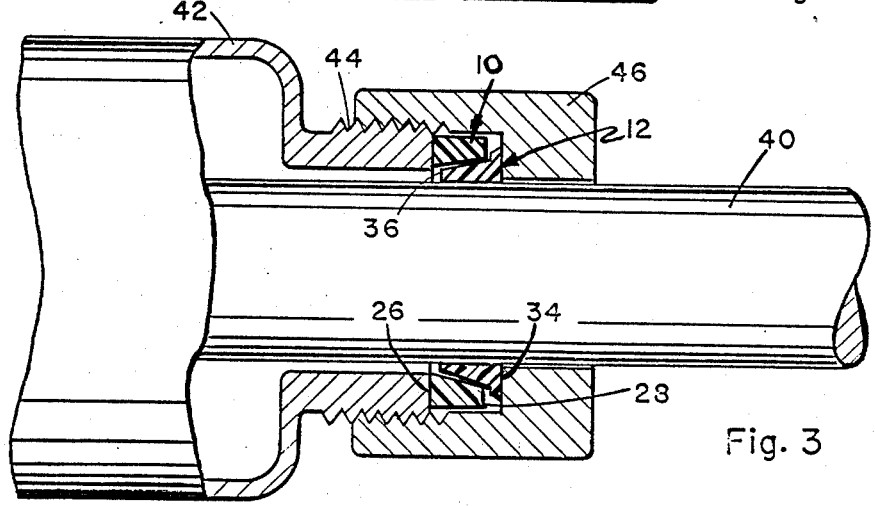
FIG. 3 is an axial sectional view of the sealing ring as used on a reciprocating rod element.

The inner ring 12 is also generally frusto-conical except for the shoulder 48 hereinafter described. The tapered radially outward face 32 extends from said shoulder 48 to a reduced end face 36 which can be flat. The radially inward face 38 of the inner ring is recticylindrical for the snug reception of a recticylindrical element to be sealed, such as the sight glass 18 in FIG. 2 or the reciprocating piston like rod indicated in FIG. 3 at 40 as associated with a cylinder 42 having a threaded neck 44 to receive a gland nut 46 for compressing the seal. The sealing required for a puff iron valve, not illustrated, is another example of the broad field of use for this packing ring. In such circumstances a gland nut or the equivalent may be tightened after a considerable period of use, forcing the rings 10 and 12 together, often after after a year or more of use. An annular shoulder 48 on the larger end of the inner ring 12 acts as a limiter or stop to limit the penetration of the inner ring into the outer ring since without such shoulder 48 the sealing action of the conjugate ring would become comparable only to an ordinary wafer type sealing ring. With the shoulder 48 contacting end face 28 of the outer ring a new or additional line contact sealing action is achieved at the shoulder, extending the useful life of the packing ring and allowing time for replacement of the item. It should be noted that the width of the shoulder per se is small, that is, the radial dimension of the annular shoulder as such is much less than the corresponding radial dimension of the face 28 of ring 10 to achieve the line contact sealing action at the shoulder 48.

However, the principal sealing action of this conjugate packing ring is that achieved at the interface of the tapered surfaces 30 and 32. To achieve somewhat localized and maximized pressure of the inner ring upon a limited annular portion of the bore face 30 the angle of taper of the face 32 of the inner ring is slightly greater than the taper of face 30 of the outer ring, the taper of the face 32 is preferably on the order of 30° when the taper of face 30 is on the order of 20°.

The method of using this invention will be obvious from the foregoing description of the structure.

What we claim as new and desire to secure by Letters Patent, is:

1. A conjugate packing ring for sealing fixed and cylindrical elements, using a gland nut, said packing ring, comprising: a substantially rigid, slightly compressible inner ring, of non-metallic material and discrete from said elements, having a cylindrical bore for snug reception of one of said elements and having a smooth external, tapered surface and having two flat faces normal to the axis of said bore; and an outer ring, of non-metallic material and discrete from said elements, encircling said inner ring and having a tapered bore receiving the tapered external surface of the internal ring in intersealing relationship therewith and having two flat end faces and in use with a gland nut pressing said inner ring between said outer ring and said one of the elements, said inner ring having an annular shoulder extending radially outwardly of the inner ring and between the larger end of said tapered external surface and the flat end face at that end, said shoulder limiting the penetration of the inner ring into the outer ring and providing sealing contact with the corresponding one of said end faces of said outer ring when said gland nut is sufficiently tightened.

2. A packing ring according to claim 1 wherein said shoulder per se has an outer radial dimension much less than the corresponding radial dimension of said corresponding flat end face on the outer ring, so that said sealing contact therewith is a substantially line contact.

* * * * *